United States Patent [19]

del Fierro

[11] Patent Number: 4,607,885
[45] Date of Patent: Aug. 26, 1986

[54] HEAD RESTRAINT FOR CHILD'S SEAT

[76] Inventor: Jose M. Q. del Fierro, 530 Mill Ave. S., Unit #1, Renton, Wash. 98055

[21] Appl. No.: 693,523

[22] Filed: Jan. 22, 1985

[51] Int. Cl.⁴ ............................................. A47C 7/38
[52] U.S. Cl. .................................... 297/397; 128/134; 297/216; 297/485
[58] Field of Search ............... 297/216, 464, 485, 487, 297/488, DIG. 6, 391, 393, 394, 395, 397; 128/DIG. 23, 133, 134

[56] References Cited

U.S. PATENT DOCUMENTS

| | | | |
|---|---|---|---|
| 2,492,383 | 12/1949 | Jones | 128/133 X |
| 2,582,571 | 1/1952 | Thoma | 297/397 |
| 3,218,103 | 11/1965 | Boyce | 297/464 X |
| 3,262,717 | 7/1966 | Graham | 297/488 X |
| 3,376,064 | 4/1968 | Jackson | 297/391 |
| 3,480,976 | 12/1969 | Yavner | 297/391 X |
| 3,606,885 | 9/1971 | Lund | 128/134 |
| 3,713,695 | 1/1973 | Von Wimmersperg . | |
| 3,722,951 | 3/1973 | Ezquerra | 297/488 |
| 3,897,777 | 8/1975 | Morrison | 128/133 |
| 4,331,339 | 1/1982 | Heath . | |
| 4,339,151 | 7/1982 | Riggs . | |
| 4,383,713 | 5/1983 | Roston | 297/464 X |
| 4,402,548 | 9/1983 | Mason | 297/464 |

FOREIGN PATENT DOCUMENTS 1537611 7/1968 France ................ 297/464
1009546 11/1965 United Kingdom ................ 297/216

OTHER PUBLICATIONS

Safety Travel Chairs Inc., Transporter Institutional Models, 9/1981, p. 1.
Jafco Catalog, 1984, p. 387, particularly Gold Bug "Heads Up" Baby Head Support, also showing several baby seats now marketed.

*Primary Examiner*—James T. McCall
*Assistant Examiner*—Thomas A. Rendos
*Attorney, Agent, or Firm*—Graybeal & Cullom

[57] ABSTRACT

A head restraining device for preventing possibly injurious forward and lateral motion of the head of a child seated in a child's seat, such device comprising a rigid U-shaped restraining member which surrounds the forward and lateral portions of the child's head, and is of a size to be separated therefrom by a slight air gap so as to not be uncomfortable yet be capable of being engaged by the child's head and restraining such from any more than minimal forward and lateral motion. A flexible tether removably and adjustably anchors the head restraint to the back of the child's seat at any selected height. With the restrainer thus anchored, support members at the ends thereof aid in maintaining the restrainer rigid with respect to the front surface of the seat back and preventing the device from slipping out of place relative to the child's head.

10 Claims, 4 Drawing Figures

HEAD RESTRAINT FOR CHILD'S SEAT

FIELD OF THE INVENTION

This invention relates to childrens' seats, and more particularly to a device for preventing possibly injurious forward and lateral motion of the head of a child seated in a child's automotive seat.

BACKGROUND OF THE INVENTION

Seating devices for bodily restraining children traveling in automobiles are commonplace, and are the object of many patents. These devices typically restrain the child's torso, preventing it from being thrown forward in the event of an impact. While these devices reduce the likelihood of bodily injury to the child, the potential for hyperextensive injuries of the neck, more commonly known as "whiplash", remains high. Such injuries are particularly dangerous for small infants whose neck muscles are not yet capable of fully supporting the head.

U.S. Pat. No. 4,339,151, to Riggs, discloses an adult head restraint comprising a headband attached to a strap wrapped around the chair. The Riggs device is capable of providing only a limited degree of restraint against forward motions of the head, and provides no resistance to lateral motion of the head to either side. In addition, the direct physical contact between the Riggs device headband and the user's head could prove uncomfortable and unduly restraining to the user.

SUMMARY OF THE INVENTION

It is an object of this invention to provide a head restraint for a child's seat capable of restricting both forward and lateral motion of the child's head.

It is a further object of this invention to provide a head restraint which is comfortable to the child when in use.

It is yet another object of this invention to provide a head restraint capable of secure and rigid attachment to, yet rapid removal from, the child's seat.

It is yet another object of this invention to provide a head restraint of simple design and quite suitable for manufacture in large volume.

These and other objects of the invention, as will be apparent in this disclosure, are provided by a head restraint comprising a relatively rigid U-shaped restraining member anchored to the forward surface of the back of a child's seat by a strap or belt type tether and supported perpendicularly against the back of the child's seat by support members. The head restraint is positioned adjacent to but separated or spaced slightly from the child's forehead and temples, thus loosely but non-bindingly restraining the child's head. Extensive forward motion is prevented by a forward portion of the restraining member, which is anchored to the child's seat by the strap. Extensive lateral head motion is likewise prevented by the side portions of the restraining member.

The restraining member comprises substantially concentric interior and exterior walls connected by one or more bracing members, providing a simple, lightweight design suitable for mass production. The interior surface of the restraining member is preferably padded with a layer of relatively soft foam-like material to cushion the impact of the child's head. In an alternative embodiment, the restraining member comprises a semi-rigid, closed cell foam body of like consistency throughout.

The support members depend perpendicularly from the ends of the restraining member so as to rigidly support the restraining member in a position generally perpendicular to the back of the seat, thus preventing the head restraint from falling down and obscuring the child's vision. The support members are preferably formed integrally with the restraining member.

The flexible tethering strap holds the head restraint firmly against the back of the child's seat. It is suitably attached about midway between its free ends to the forwardmost portion of the exterior surface of the restraining member, and extends therefrom around the back of the child's seat. The tether ends can be fastened either by a conventional buckle and strap or by a flexible hook and eye type connection such as velcro fastening means.

Other features and advantages of the head restraints of the present invention will become apparent from the following description of the preferred embodiment and the accompanying drawings.

DESCRIPTION OF THE PREFERRED EMBODIMENT

Figure 1:
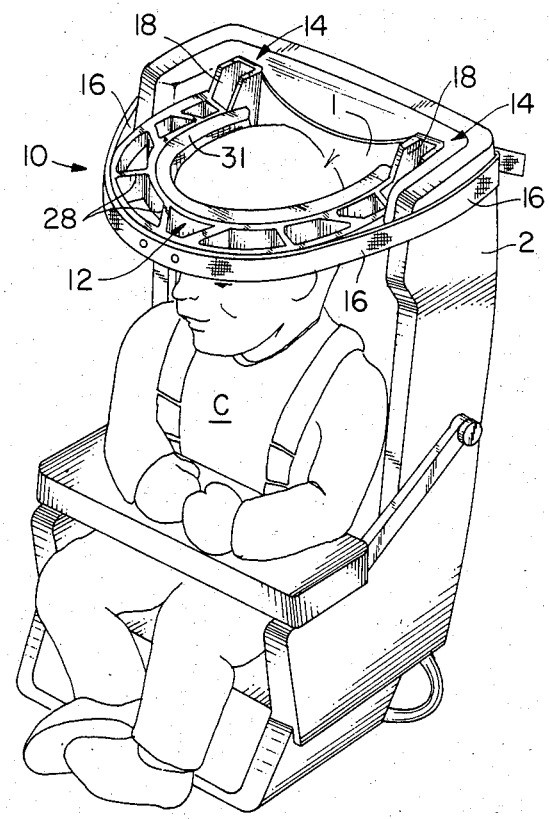
FIG. 1 is an isometric view from an upper aspect of the head restraint embodying the invention, attached to a typical automobile child's seat so as to restrain a child's head from possible injurious movement.

The preferred embodiment of the head restraint 10 of this invention is attached to the forward portion 1 of the back 2 of a child's car seat. The head restraint 10 is installed to be positioned at or near the level of the forehead of a child C seated in the car seat, and projects forwardly from the seat back 2 so that it and the seat back together loosely encircle the child's head.

The head restraint 10 comprises a U-shaped restraining member 12, two support members 14, and a tether 16. The U-shaped restraining member 12 is positioned with its major plane extending substantially horizontally. Two ends 18 of the restraining member 12 are positioned adjacent the forward portion 1 of the seat back 2. The support members 14 extend perpendicularly to the major plane defined by the restraining member, supporting the restraining member in a position substantially perpendicular to the seat back 2, thus preventing the head restraint from shifting out of effective postion.

The tether 16 comprises a relatively flat strip or band of flexible material such as woven belting, removably and adjustably attaching the head restraint 10 to the seat back 2. The tether 16 is attached to the restraining member 12 at a point substantially midway between two free ends of the tether, and extends therefrom toward the seat back. The free ends of the tether 16 are removably connected to each other as described below, thus adjustably and removably attaching the head restraint to the child's seat so as to be firmly anchored thereon when the tether strap 16 is tautly installed.

Figure 2:
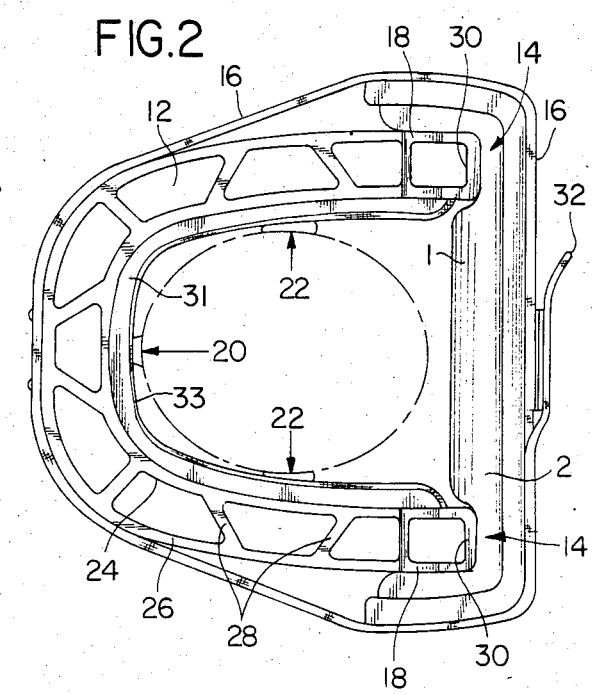
FIG. 2 is a detailed top plan view of the head restraint of FIG. 1 showing the bracing members spanning between the interior and exterior walls, and further showing the two free ends of the tether tautly connected at the rear surface of the back of the child's seat.

As best seen in FIG. 2, the restraining member 12 comprises a substantially U-shaped element extending from the seat back 2 forwardly to encircle the child's forehead and be slightly spaced therefrom so as to be not uncomfortable. That portion of the restraining member 12 forward of the child's forehead is defined as the forward portion 20 thereof. It is this forward portion 20 which prevents gross, possibly injurious forward motion of the child's head, as in an automobile impact. Those portions of the restraining member 12 laterally to the left and right of the child's temples are defined as its side portions 22. These side portions 22 similarly prevent gross, possibly injurious lateral motion of the child's head to the left or right. When the head restraint 10 is used in combination with a child's seat having a seat back 2 capable of preventing rearward motion of the child's head, the head restraint and seat back effectively surround the head and prevent all dangerous gross motions of the child's head.

As best shown in FIG. 2, the restraining member 12 of the presently preferred embodiment is constructed as a U-shaped braced element, of solid, molded polyethylene or like plastic, having an interior wall 24, an exterior wall 26, and multiple bracing members 28. The interior and exterior walls 24, 26 are flat, elongate, substantially two-dimensional elements oriented with their shorter dimensions perpendicular to the plane defined by the restraining member and their longer dimensions in said plane, and formed to have overall a substantially U-shaped configuration. The exterior wall 26 has a longer dimension sufficiently greater than the longer dimension of the interior wall 24 so that when the interior wall is positioned interiorly of the exterior wall, the interior and exterior walls are separated by a gap of predetermined width, for lightness consistent with adequate strength.

The interior and exterior walls 24, 26 are rigidly connected by bracing members 28 spanning the gap between them. Each bracing member 28 extends from the interior wall 24 outwardly away from the child's head to the exterior wall 26, and is rigidly attached to the interior and exterior walls. An end brace 30 at each end 18 of the restraining member 12 connects the ends of the interior and exterior walls 24, 26. The end braces 30 provide a flat surface adjacent the seat back 2 of the child's car seat, firmly supporting the restraining member 12 against the seat back.

The interior surface of the interior wall 24 is preferably padded with a resilient foam-like material 31 to cushion any contact between the child's head and the head restraint. This padding 31 extends along the entire interior wall to cushion lateral motion as well as forward motion. The interior wall 24 is sized to provide a gap between the padding 31 and the child's head so that small head movements of the child will not be constricted and the child will not feel uncomfortable when "wearing" the restraining member. A fabric covering 33 is attached to the surface of the padding 31 which faces toward the child's head.

Figure 3:
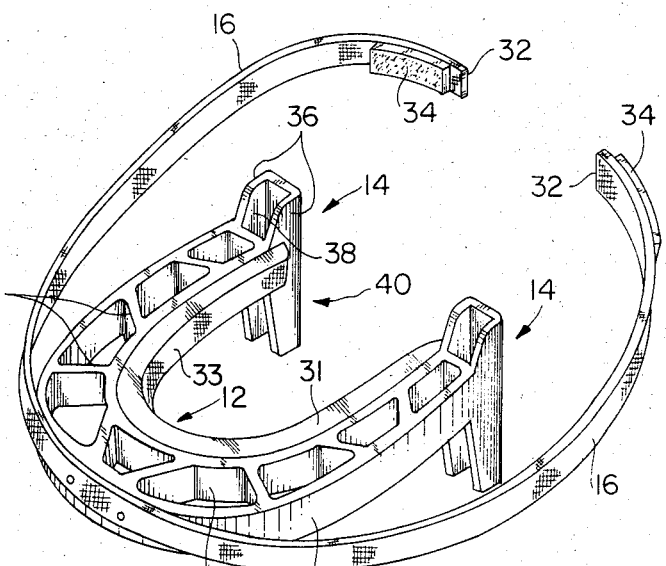
FIG. 3 is a detailed isometric view from an upper aspect of the head restraint of FIG. 1, showing the attachment of the tether to the restraining member, the hook and eye type tether connection, and the support members.

As best seen in FIG. 3, the tether 16 is installed to tautly encircle the restraining member 12 and the seat back 2, firmly holding the restraining member against the seat back. The tether 16 is attached to the exterior wall 26 at the forward portion 20 of the restraining member 12. The tether 16 extends therefrom toward the seat back 2 and the free ends 32 of the tether 16 meet behind the seat back 2, where they are joined by connecting device 34. The connecting device 34 provides a means for removably and adjustably attaching the free ends 32 of the tether, allowing the head restraint 10 to be used with childrens' seats of various dimensions.

The connecting means 34 of the preferred embodiment of this invention comprises a strip of fabric-like material, conventional per se, such as velcro having multiple "eye elements" attached to a first tether end 32 along an interior surface facing the child's head, and a complementary strip of fabric-like material having multiple "hook elements" fixedly attached along an exterior surface of a second tether end 32 facing away from the child's head. The first and second tether ends 32 are connected by placing the two fabric-like elements of the attachment means 34 in proximal contact with each other and pressing the two tether ends together, causing the "hooks" to engage the "eyes". It is considered that velcro or its equivalent is best suited for removably and adjustably connecting the tether ends 32.

As best seen in FIG. 3, a support member or stabilizer 14 is rigidly attached to each end 18 of the U-shaped restraining member 12, depending therefrom perpendicularly to the plane of the restraining member. The vertical orientation of the support members 14 assists in securely cantilevering the restraining member 12 forwardly from the seat back forward portion 1 in a position substantially perpendicular to the seat back, thus anchoring the restraining member to the seat back and preventing the restraining member from falling down and obscuring the child's vision, or otherwise shifting.

Each support member 14 comprises interior and exterior walls 36, 38 coplanar with the interior and exterior walls 24, 26 of the side portions 22 of the restraining member 12. These support member walls 36, 38 comprise flat, elongate elements having a longer dimension oriented vertically in the direction of the shorter dimension of the restraining member walls 24, 26, and a shorter dimension oriented in the direction of the longer dimension of the restraining member walls. The support member walls 36, 38 are rigidly connected along a portion of a forward edge surface to an edge surface of the end of the wall of the restraining member. The two support member walls 36 of each support member 14 are rigidly connected to each other by a flat substantially rectangular support face 40 rigidly attached perpendicularly to the support member walls, and spanning between the support member walls. The support face 40 contacts the seat back forward portion 1 of the child's seat when the head restraint 10 is in place.

Figure 4:
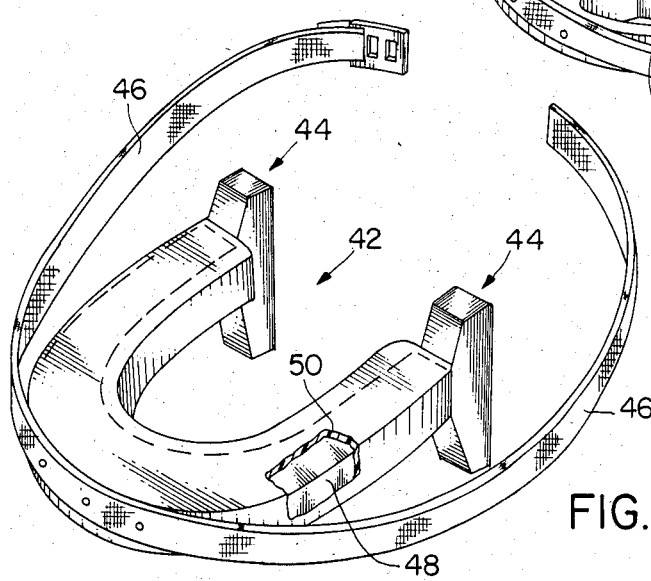
FIG. 4 is an isometric view from an upper aspect of an alternative embodiment of the head restraint of the present invention constructed from a solid, substantially rigid foam-like material and having a buckle and strap tether as its anchoring means.

An alternative embodiment of this invention, shown in FIG. 4, comprises a semi-rigid foam type restraining member 42 and support members 44, and a buckle and strap type attaching device 46. The restraining member 42 is suitably fabricated from a substantially rigid closed cell foam material 48, with a relatively soft, solid plastic covering 50.

As will be apparent, child head restraints according to the present invention can be made and marketed in a variety of sizes to accommodate various head sizes as a child grows, for example. Studies have shown that, from age one month to age three years, a child's head grows in size mostly in the front to rear dimension and very little in the side to side dimension. In view of this, an alternative way to increase the size of a given restrainer as the child grows is to provide snap-on blocks of appropriate thickness, e.g. one inch, which are attachable to the rear faces of the support members 14. With respect to adjustability, also, one of the advantages of head restraints according to the invention is that the tether means holding the restrainer in place on the seat back is selectively installable at any of various heights relative to the back, so that the restrainer placement can be easily matched to the height of the child occupant in each instance of use and as the child grows or when the restrainer is installed for use with a child of a different size or on a different seat back.

It will be appreciated that, although specific embodiments of the invention have been described for purposes of illustration, various modifications and adaptations thereof may be made without departing from the spirit and scope of the invention as defined by the following claims.

What is claimed is:

1. A head restraint device for preventing possibly injurious forward and lateral motion of the head of a child seated in a conventional child's seat, comprising:
   a rigid U-shaped restraining member which surrounds the forward and lateral portions of the child's head when the restraining member is positioned with distal ends thereof adjacent a forward surface of a seat back of any selected one of various conventional child's seats of different forms, and is of a size not to be uncomfortable yet be engaged by the child's head and restrain such from any more than minimal forward and lateral motion;
   support members, each attached to one end of the restraining member, which aid in maintaining the restraining member rigid with respect to the forward surface of the seat back and positioned in place around the child's head; and
   flexible tether means fixedly attached to the restraining member, and firmly yet adjustably holding the ends of the restraining member against the forward surface of the seat back; wherein the head restraint is readily attachable to said child's seat by engagement of the tether means with the seat back.

2. The head restraint of claim 1, wherein the restraining member comprises an interior wall, an exterior wall, and bracing members connecting the interior and exterior walls.

3. The head restraint of claim 1, wherein the restraining member comprises a substantially solid element with a relatively firm foam body.

4. The head restraint of claim 1, further comprising padding disposed between an interior surface of the restraining member and the child's head.

5. The head restraint of claim 4, further including a layer of fabric disposed between the padding and the child's head.

6. The head restraint of claim 1, wherein the tether means if fixedly attached to the restraining member at a point which is located forward of the child's forehead when the head restraint is positioned in place around the child's head.

7. The head restraint of claim 1, wherein the tether means further comprises fabric-like interengaging hook and eye fastener means for removably and adjustably connecting opposed free ends of the tether means.

8. The head restraint of claim 1, wherein the tether means further comprises a strap and buckle type means for removably and adjustably connecting opposed free ends of the tether means.

9. A child's head restraint for use in conjunction with a conventional high back child's car seat, comprising:
   a relatively rigid U-shaped member having two ends contacting a forward surface of the back of any selected one of various conventional child's seats of different forms, including:
   an interior wall, an exterior wall, and bracing components rigidly connected the interior wall and the exterior wall, and
   relatively soft foam-like padding attached to an interior surface of the interior wall of the member and covered by a layer of fabric;
   supports, each attached to one end of the member, which aid in maintaining the member rigid with respect to the forward surface of the seat back and positioned in place around the child's head; and
   a relatively flexible tether encircling the member and the back of the child's seat and non-invasively anchoring said member to said back of said seat.

10. A head restraint according to claim 9, wherein the configuration of the interior surface of the rigid U-shaped member is of a size to loosely surround the forward and side portions of the child's head so as to not be uncomfortable yet be capable of being engaged by the child's head and restrain such from any more than minimal forward and lateral motion.

* * * * *